Oct. 15, 1963   I. H. CULVER ETAL   3,106,964
HELICOPTER ROTOR

Filed Jan. 22, 1962   6 Sheets-Sheet 1

INVENTORS.
IRVEN H. CULVER
HENRY C. DANIELSON
J. FORD JOHNSTON
BY
George C. Sullivan
Agent Oct. 15, 1963    I. H. CULVER ET AL    3,106,964
HELICOPTER ROTOR
Filed Jan. 22, 1962    6 Sheets-Sheet 3
FIG. 4
ROTOR STARTS PRECESSING NOSE UP
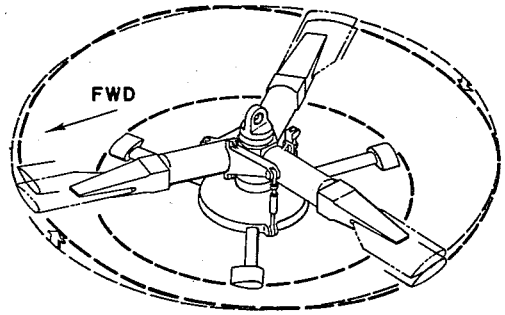
FIG. 5
ROTOR STARTS PRECESSING NOSE DOWN
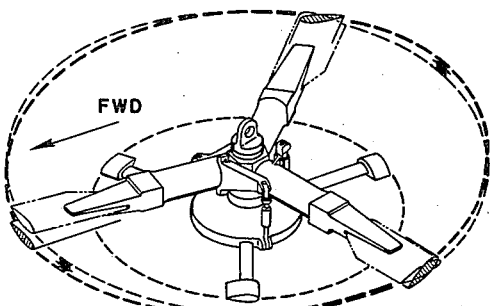
MINIMUM LIFT ON RIGHT SIDE
MAXIMUM LIFT ON LEFT SIDE
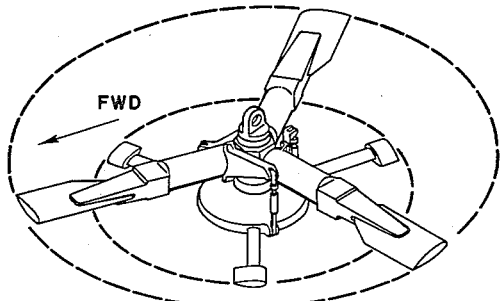
GUST INDUCED NOSE UP PRECESSION IS COUNTERED
BY GYRO INDUCED NOSE DOWN PRECESSION
ROTOR ASSUMES ORIGINAL ATTITUDE
FIG. 6
INVENTORS.
IRVEN H. CULVER
HENRY C. DANIELSON
J. FORD JOHNSTON
BY
Agent Oct. 15, 1963    I. H. CULVER ETAL    3,106,964
HELICOPTER ROTOR
Filed Jan. 22, 1962    6 Sheets-Sheet 4
Fig. 7
CONTROL GYRO PRECESSES NOSE DOWN AND
INDUCES CYCLIC PITCH ON ROTOR BLADES
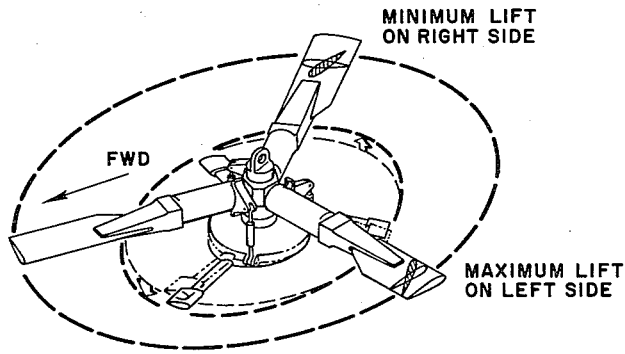
Fig. 8
ROTOR PITCHES NOSE DOWN AS
COMMANDED BY CONTROL GYRO
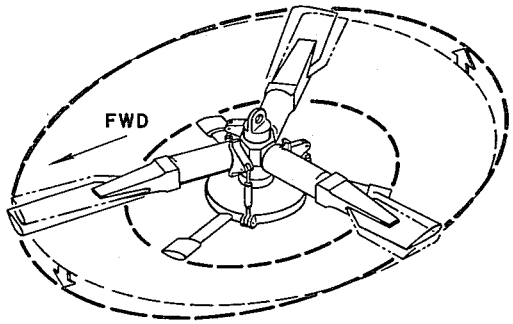
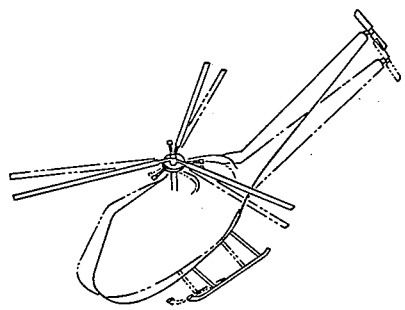
AIRCRAFT PITCHES NOSE DOWN
AS PILOT INTENDED
Fig. 9
INVENTORS.
IRVEN H. CULVER
HENRY C. DANIELSON
J. FORD JOHNSTON
BY
*George C. Sullivan*
Agent

Fig. 10
TRANSLATION
LIFT ON ADVANCING SIDE OF CONTROL GYRO
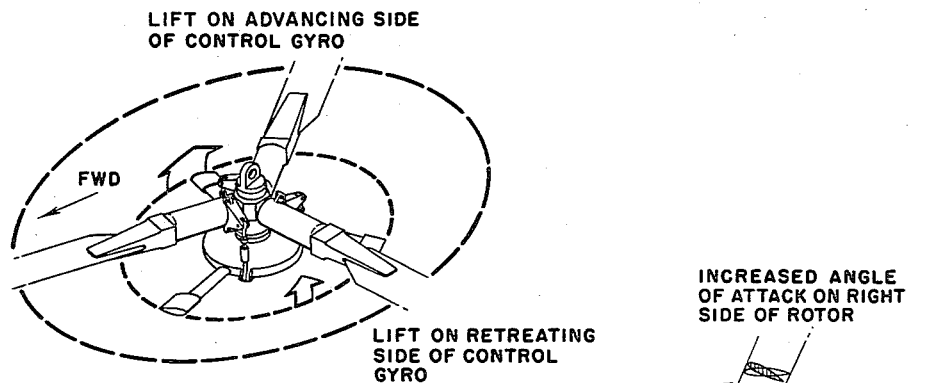
LIFT ON RETREATING SIDE OF CONTROL GYRO
INCREASED ANGLE OF ATTACK ON RIGHT SIDE OF ROTOR
Fig. 11
CONTROL FORCE OR TRIM REMOVED
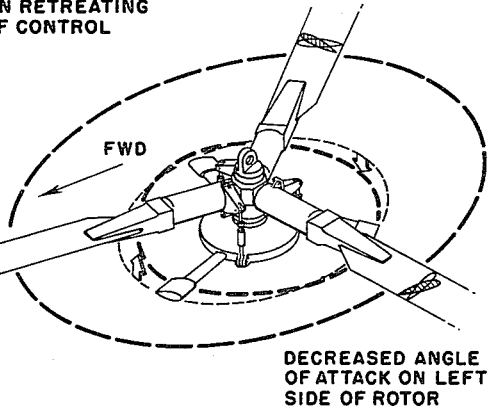
DECREASED ANGLE OF ATTACK ON LEFT SIDE OF ROTOR
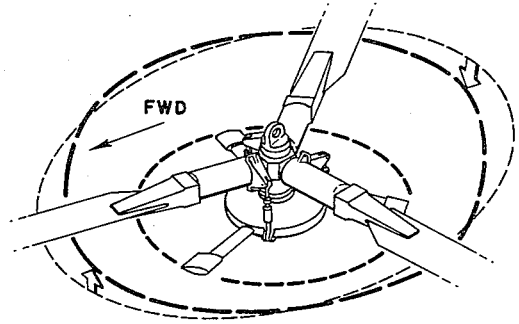
FINAL ATTITUDE OF CONTROL GYRO AND ROTOR
Fig. 12
INVENTORS.
IRVEN H. CULVER
HENRY C. DANIELSON
J. FORD JOHNSTON
BY
George C. Sullivan
Agent Oct. 15, 1963     I. H. CULVER ETAL     3,106,964
HELICOPTER ROTOR
Filed Jan. 22, 1962                    6 Sheets-Sheet 6

Fig. 13
ROTOR DISTURBED

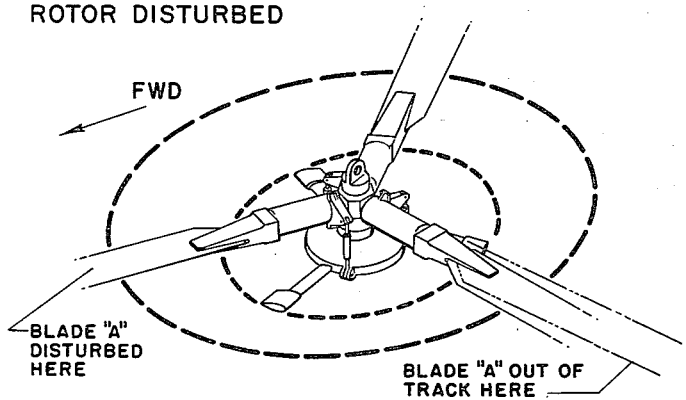

FWD

BLADE "A" DISTURBED HERE

BLADE "A" OUT OF TRACK HERE

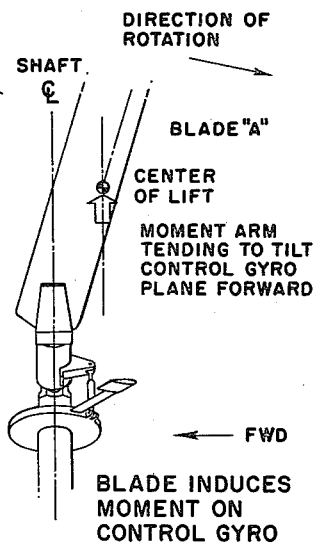

DIRECTION OF ROTATION

SHAFT ℄

BLADE "A"

CENTER OF LIFT

MOMENT ARM TENDING TO TILT CONTROL GYRO PLANE FORWARD

← FWD

BLADE INDUCES MOMENT ON CONTROL GYRO

Fig. 14

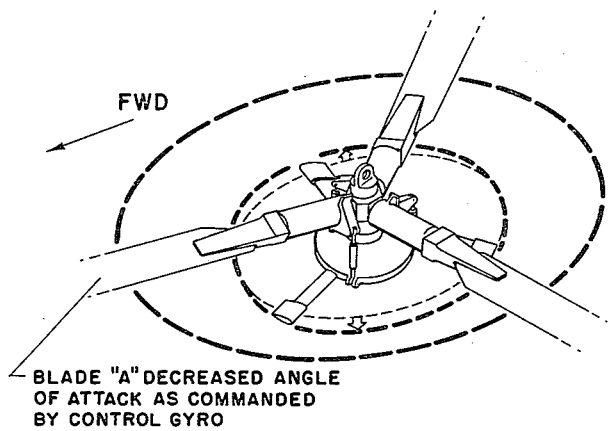

FWD

BLADE "A" DECREASED ANGLE OF ATTACK AS COMMANDED BY CONTROL GYRO

ROTOR SYSTEM COUNTERS DISTURBING FORCE

Fig. 15

INVENTORS.
IRVEN H. CULVER
HENRY C. DANIELSON
J. FORD JOHNSTON
BY

*George C. Sullivan*
Agent

United States Patent Office 3,106,964
Patented Oct. 15, 1963

3,106,964
HELICOPTER ROTOR
Irven H. Culver, Burbank, Henry C. Danielson, Northridge, and J. Ford Johnston, Sunland, Calif., assignors to Lockheed Aircraft Corporation, Burbank, Calif.
Filed Jan. 22, 1962, Ser. No. 167,878
7 Claims. (Cl. 170—160.13)

This invention relates to a rotary wing aircraft such as a helicopter.

Rotary wing aircraft have been notoriously unstable. Stability has been obtained through complex mechanisms usually involving gyros and electronic control apparatus. The rotors and their control systems have been relatively complex demanding careful maintenance and a considerable amount of skill on the part of the pilot in order to fly the aircraft.

It is an important object of the present invention to provide a rotary wing and control system having a high inherent stability which permits hands off flight and all weather flight. The gyroscopic characteristic of the rotor blade and a second or control gyro operate together to provide earth sensing characteristics. All control inputs are in series from the control stick through the control gyro to the rotor blade.

It is another object of this invention to provide a rotary wing control system wherein control inputs will be modulated through a spring cartridge to permit the control gyro between the control stick and the rotor to maintain stability even though the control stick is rigidly held.

It is another object of this invention to provide a rotor having power on compliance features so that disturbances to the aircraft or its rotor during powered flight will be dampened. The gyroscopic characteristic of the rotating rotor are utilized in conjunction with a small control gyro to change the pitch of the rotor blades to dampen out the results of the disturbance.

It is another object of this invention to provide a rotary wing and control system having power off compliance capabilities. The rotor blade axis is swept slightly forward of the feather axis so that when power off flight conditions are in effect disturbances to the blade will cause it to rotate about the feather axis in such a manner that the results of disturbances will be counteracted by a change in pitch of the rotor so as to overcome those disturbances.

It is another object of this invention to provide a rotary wing and control system having a high degree of speed stability. Control gyro weights are shaped with aerodynamic lifting surfaces to increase the pilot stick force with increasing forward speed.

It is another object of this invention to provide a rotary wing and control system which permits a wide center of gravity excursion range. The stable rotor system with the rotor rigidly attached to the fuselage provides that the center of lift of the rotor system can be offset by cyclic pitch control so that the center of gravity range is limited only by the structural design of the blades.

Other objects and advantages of this invention will become apparent from the reading of the following specification and claims, wherein the following figures show the details whereby the above objects may be obtained.

FIGURES 4, 5 and 6 show the inherent stability aspects of the rotary wing.

FIGURES 7, 8 and 9 show the rotary wing cyclic control results.

FIGURES 10, 11 and 12 show the speed stability of the rotary wing.

FIGURES 13, 14 and 15 describe the effects of the forwardly swept blade.

Before discussing the details of the invention it would be well to review the basic principles of the gyroscope since a large rotating mass such as a rotor is essentially a gyroscope. The gyroscope as a rotating mass has two characteristics quite different from those of an equal stationary mass. First, it has a gyroscopic inertia which is the reluctance of a rotating mass to change its plane of rotation unless acted upon by an external force. Thus, in the plane of the force little or no motion occurs. It can also be said of this rotating mass that intending to maintain its plane of rotation it has an inherent in-plane stability.

A gyroscope has precession which can be defined as the angular change of the plane of rotation under the action of an applied moment. This means that when sufficient force is applied to change the plane of rotation of the rotating mass, the reaction occurs 90° later in the direction of the rotation and the angular change is in the direction of the applied moment.

The helicopter rotor is a prime example of a large rotating mass to which these gyroscopic principles apply.

The basic concept of the present rotary wing and control system is to utilize a completely rigid system and to couple properly the aerodynamic and gyroscopic forces generated by the rotor and apply these forces directly to the body of the vehicle. This is accomplished by combining three major elements: a rotor, a control gyro and a spring control system.

The present rotor system consists of blades which are fixed to the hub and are only free to rotate about the feathering axis for cyclic and collective pitch changes. The hub in turn is attached rigidly to the mast and the mast is rigidly attached to the fuselage. This type of rotor results in inherent stability.

Figure 1:
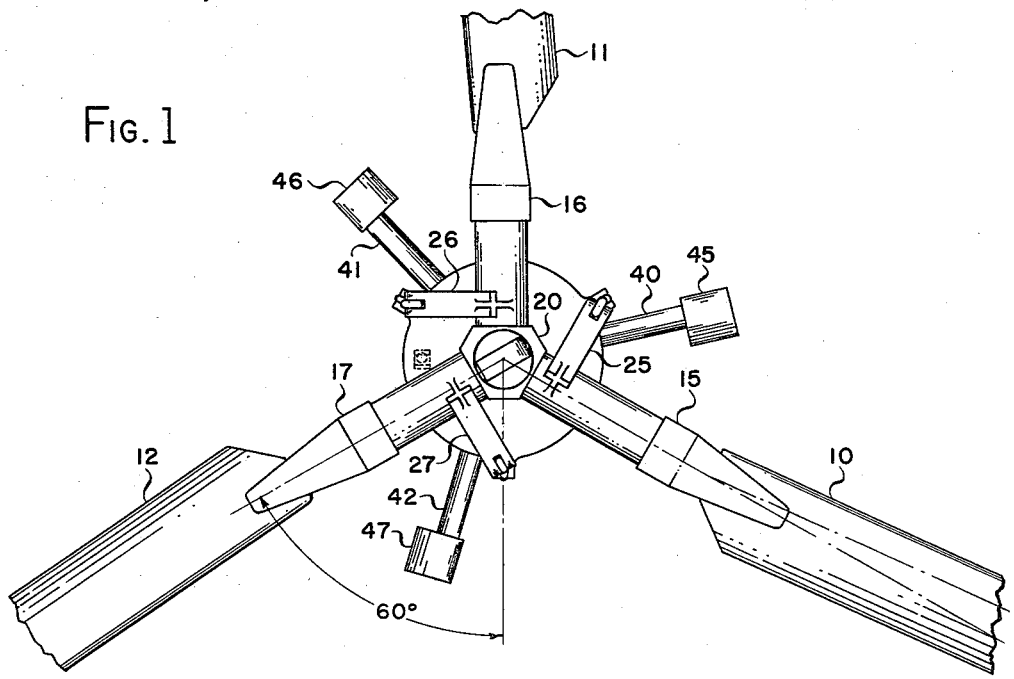
FIGURE 1 is a plan view of the rotary wing, its swashplate and control gyro.
Figure 2:
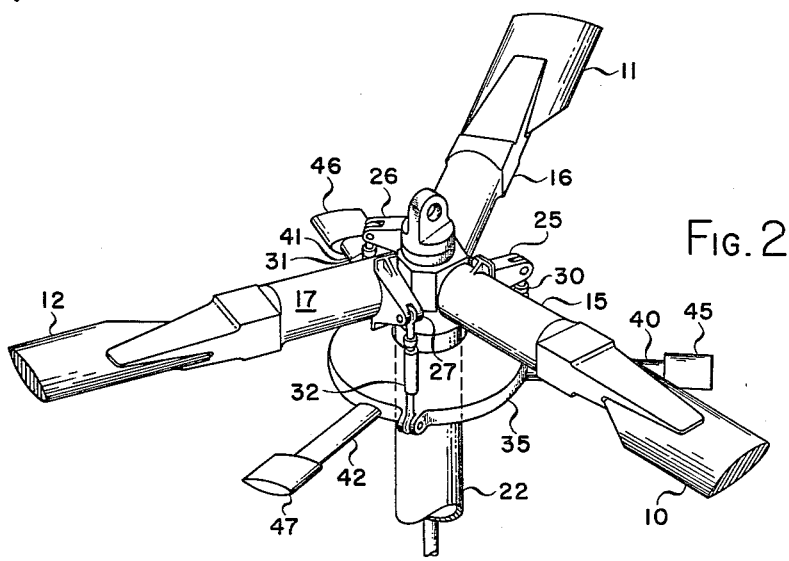
FIGURE 2 is a perspective view of the rotary wing.

The main rotor of the present invention is shown in FIGURES 1 and 2. The rotor consists of blades 10, 11 and 12 attached to cuffs 15, 16 and 17 which are rotatably attached about feathering axis to hub 20. The cuffs are attached to stub axes on the hub by feathering axis bearings to allow blade oscillation about the feathering axes. The blade centrifugal force is transferred into the hub and vertical drive shaft 22 through the cuffs. The feathering axis bearings provide the only degree of freedom the blade possesses, that being the freedom to change the blade angle of attack.

Blades 10, 11 and 12 receive angle of attack control inputs through horns 25, 26 and 27 fixed to the forward edge of cuffs 15, 16 and 17 respectively. To the forward end of each of the horns 25 through 27 are attached links 30 to 32 respectively which are pivoted at their lower ends to the edge of swashplate 35. Swashplate 35 rotates with the rotor.

In addition to taking advantage of the gyroscopic inertia of the main rotor, the present invention employs a control gyro integral with the swashplate comprised of arms 40, 41 and 42 rigidly fixed to the edges of swashplate 35 on the ends of which are masses 45, 46 and 47. The control gyro-swashplate is the master for the pitch control to the blades. The masses 45, 46 and 47 are shaped to have an aerodynamic positive pitch to develop aerodynamic lift for use as a control input to be later described.

Figure 3:
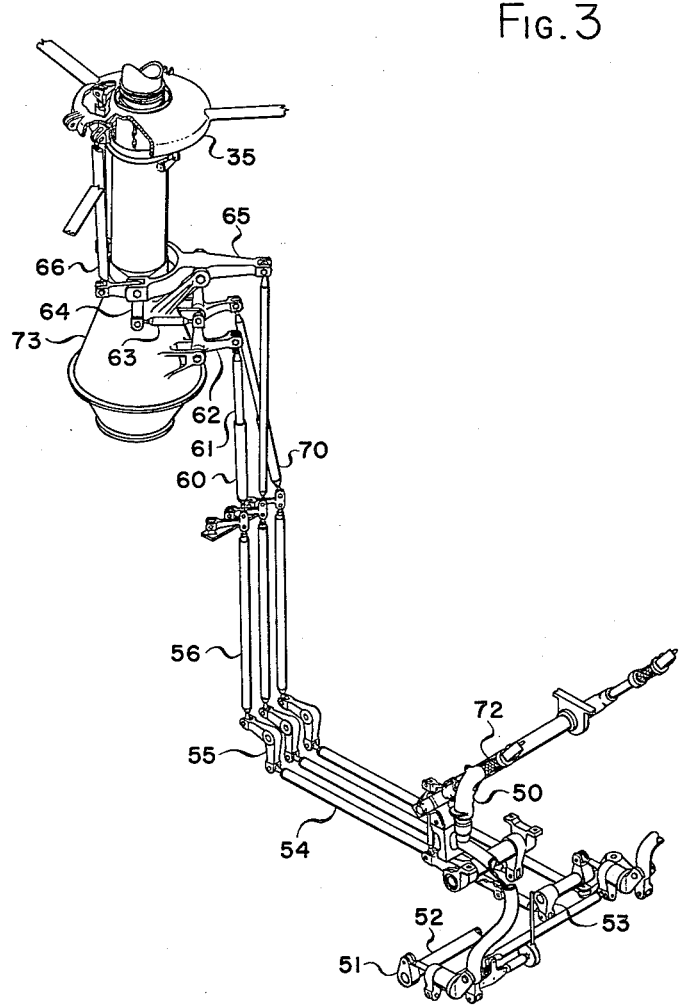
FIGURE 3 shows the control system schematic.

The cyclic control system as shown in FIGURE 3 is a conventional push pull system except for the addition of a spring cartridge (60, 70) between the pilot controls and the rotor. Since the control gyro is controlled by force, the inclusion of this spring provides a matching of the cyclic deflection with the required control force. The spring also modulates the pilot control inputs so that the vehicle will change attitude at a rate proportional to the control stick deflection. In addition, the spring allows the control gyro to maintain flight stability even though the cyclic stick is rigidly held.

The present invention can best be understood by visualizing the main rotor and the control gyro as two rotating masses. Since both have inherent gyroscopic characteristics they have been so designed that they tend to rotate in parallel planes. These rotating masses are connected by links which connect the control gyro to each blade pitch control arm in such a manner as to offset the blade control input to a theoretical 90°. As long as the control gyro and the rotor planes remain parallel, no cyclic blade change is introduced. But if either the rotor or the control gyro is displaced with respect to the other cyclic pitch automatically ensures. Random external forces such as gusts of wind or body moments tend to displace the rotor while the pilot's intentional control inputs displace the control gyro.

Now let us examine the case of the rotor and the fuselage to which it is rigidly attached pitching nose up from some external cause. Many things could cause this. One example would be a gust striking the rotor or fuselage and imposing a rolling moment on either which would tend to lift the rotor on the advancing or right hand side as described herein. Since the rotor is a gyroscope, it will precess 90° downstream from the plane of the applied moment and would tend to pitch nose up as shown in FIGURE 4. While the rotor is tending to pitch nose up, the control gyro being gimbally mounted on the rotor mast (since it is integral with gimbally mounted swashplate 35) and following the gyroscopic principles, remains in its original plane. Thus the plane of rotation of the rotor and the control gyro are no longer parallel. The resulting angle between the rotor plane and the plane of the control gyro introduces a cyclic pitch to the blades translated through the offset links, with maximum blade angle on the retreating side and minimum angle on the advancing side as shown in FIGURE 5. The aerodynamic lift on the retreating side of the rotor will thus be higher than on the advancing side. This lift difference will impose a rolling moment to the right of the rotor but the rotor still reacting as a gyroscope will precess and pitch nose down. This nose down pitching motion of the rotor opposes the nose up pitching tendency that was brought about by the hypothetical external force that was being used as an example.

This same damping occurs regardless of the direction from which the rotor disturbing moment is applied. The control gyro applies a countering aerodynamic moment to the rotor so that it remains in its original plane.

In order to prevent cross coupling which would result if the angle from the feather axis of a blade were exactly 90° to the offset links, an offset position of approximately 60° is used, as shown in FIGURE 1. The principle behind using this offset of between 0° and 90° is explained and explored thoroughly in co-pending applications Serial Number 844,886 dated October 7, 1959, now Patent No. 3,080,001 and Serial Number 73,779 dated December 5, 1960.

Now that we have shown how a rigid rotor system has achieved inherent stability through gyroscopic control of the cyclic blade pitch let us examine intentional control inputs.

As stated, a spring cartridge is installed in both the longitudinal and lateral control system to provide the pilot with the proper combination for both force and control motion. With the inclusion of this spring cartridge a forward push on the cyclic stick 50 applies a rolling moment on the control gyro through the geometry of linkages as illustrated in FIGURE 3. These include crank 51, rod 52, crank 53, push rod 54, bell crank 55, push rod 56, spring cartridge 60 in the push rod 61, bell crank 62, link 63, bell crank 64, pivoted to the collective pitch yoke arm 65 and longitudinal control push rod 66 to the swashplate 35. Note that the control input connection of rod 66 to the underside of the swashplate assembly is 90° ahead of the point of desired pitch change.

The rolling moment causes a pitch precession in the control gyro which is translated by the offset linkage to the rotor and in turn causes cyclic pitch changes in the lateral sectors of the rotor disk. These lateral cyclic pitch-changes induce an aerodynamic rolling moment on the rotor. The rotor then precesses producing a nose down motion. Since in this rotor concept the rotor is rigidly attached to the fuselage, the vehicle pitches downward as intended by the pilot when he pushes the stick forward. This action is illustrated in FIGURES 7 to 9.

A similar series of events produces a rolling motion of the entire vehicle when the pilot pushes the cyclic stick to either side placing the control input force through the spring cartridge 70 in the lateral linkage system.

A standard collective pitch control system is shown in FIGURE 3 with the usual collective pitch lever 72 supplying forces through the collective system to the collective pitch yoke arm 65 which is pivoted on an extension of the transmission 73. The inner ends of the collective pitch yoke arm are connected to the collective pitch sleeve which moves vertically. Pivoted also to the arms of the collective pitch yoke arm are the longitudinal and lateral linkages in a manner normal with conventional helicopters to date.

Stability with forward speed is provided by using the control gyro weights 45, 46 and 47 as aerodynamic lifting surfaces. They are positioned at a relatively high angle of attack attitude so that lift is maintained throughout the entire cyclic range of the control gyro. In forward flight as well as flight in any direction, the gyro weight on the advancing side produces more lift than those on the retreating side. This unbalanced lift on the control gyro creates a control input moment which attempts to tilt the control gyro upward on the advancing side. Following the gyroscopic law of precession, this moment results in a nose up pitching of the control gyro which is opposite to that which is induced by pilot input. This even though the control gyro has stabilized into the desired attitude, these lifting surfaces require that the pilot hold a constant control force to maintain the desired attitude. As speed increases these aerodynamic lifting surfaces on the control gyro create a greater unbalanced moment resulting in improper matching of increased stick forces with increasing speed. In the ordinary course of events these forces can be trimmed out to maintain the vehicle in its forward cruise condition without pilot control input. These trimming devices do not comprise a part of this invention and are not shown.

If control forces or trim is not applied to counteract precession of the control gyro, it will induce cyclic pitch on the blades which will cause the rotor plane to precess nose up and become parallel with the control gyro plane. With the rotor rigidly attached to the fuselage of the aircraft, the vehicle will gradually pitch nose up and return to its previously set speed. An illustration of this principle is outlined in FIGURES 10 to 12. FIGURE 10 shows the rotor and control gyro in a translating attitude. The different lengths of the force arrows illustrates the difference in aerodynamic lift developed by the advancing and retreating sides of the control gyro. FIGURE 11 shows the attitude the control gyro will attempt to achieve if no couneracting pilot force or time input is applied. FIGURE 12 shows the final attitudes that both the control gyro and rotor will assume if the pilot control input is not held in constant after the control gyro has induced cyclic pitch on the blades causing the rotor to precess to a nose up attitude.

As can be clearly seen in FIGURE 1, rotor blades are swept forwardly in the direction of rotation. Blade sweep is defined as an acute angle between the feathering or pitch change axis and a line parallel to and 0.25 chord aft of the blade leading edge, shown in FIGURE 1. The blades are swept forward for the purpose of damping rotor moments and preventing blade dynamic instability. To prevent rotor moments from becoming magnified into blade instability a positive compliance rate has been designed into the system. The control gyro is utilized in such a way that the blades comply or resist a disturbing force as a function of blade sweep.

This principle can best be illustrated by returning to a discussion on the basic system and showing the interactions of the control gyro, rotor assembly and interconnecting off-set linkage. In order to simplify this explanation, the discussion will consider the case of a single blade going out of track. This could be caused by several reasons such as external forces or greater aerodynamic lift on a single blade. FIGURES 13 to 15 illustrate the case of an external force tending to make the blade located over the nose of the vehicle go off and out of track. Due to gyroscopic action the reaction will occur 90° downstream along the path of rotation so that the maximum out-of-track position is on the retreating side of the rotor disk. Since the blade is swept forward of the feathering axis and the root end of the blade is restrained by the cuff bearings and the incidence arm located on the forward side of the cuff, this upward bending of the blade will create a structural out-of-plane bending moment in the blade which is resisted by a bending moment in the hub and the force of the offset link attached to the incidence arm. This force in the offset link is felt by the control gyro as a control input tending to lift the aft edge of the gyro plane. Being a gyroscope it precesses and, 90° downstream, the advancing side of the control gyro raises up. When the blade A offset linkage arrives at this high point of the control gyro plane which is when the blade is in its aft position, the blade pitch angle will be increased, or when the blade reaches the forward position over the vehicle nose, the blade angle will be decreased thus counteracting and damping out the disturbing force that instigated this process originally.

In the case where for some reason a single blade develops greater lift than the remaining blades, the blade sweep will balance the out-of-track blade against the other two blades until the control gyro receives no control input. This characteristic will reduce the distance that a blade will out of track as compared to that of a conventional system.

A helicopter rotary wing and control system has been described in detail which has in actual practice been shown to achieve each and all of those objects set out at the beginning of this specification. Having described these details, we claim the following combinations and their equivalents as our invention.

We claim:
1. In a helicopter:
   (a) a rigid rotor having a plurality of blades each with freedom of movement about its feathering axis only,
   (b) a rotor control gyro adapted to rotate in a plane parallel to the rotor plane of rotation,
   (c) a pilot control means,
   (d) a control linkage means between the pilot control means and the control gyro,
   (e) a resilient connection in the control linkage means,
   (f) linkage means between the control gyro and each of the blades of the rotor for changing the angle of attack of each blade, when the gyro and rotor planes of rotation are displaced out of parallel relationship.
2. In a helicopter:
   (a) a rigid rotor including a plurality of substantially horizontally oriented rotor blades each rotatably mounted to the rotor hub about their feathering axes,
   (b) a control gyro including a swashplate universally mounted for rotation with the rotor in a plane substantially parallel with the rotor plane and means on the swashplate to create a moment about the axis of rotation of the swashplate and rotor,
   (c) linkage means pivoted on the peripheral edge of the swashplate and the leading edge of each rotor blade so that variation between the planes of rotation of the swashplate and the rotor will result in changes in the angle of attack of the rotor blades,
   (d) a pilot control,
   (e) second linkage means between the pilot control and the control gyro for tilting the control gyro out of a plane parallel with the plane of rotation of the rotor,
   (f) a resilient connection in the second linkage means.
3. In a helicopter:
   (a) a vertical drive shaft,
   (b) a rotor hub at the upper end of the vertical drive shaft,
   (c) a plurality of laterally extending rigid rotor blades pivoted about their feathering axes to the hub,
   (d) forwardly extending control horns on each rotor blade,
   (e) a swashplate mounted for universal pivoting and rotation with the rotor about the vertical drive shaft,
   (f) means to tilt the swashplate out of a plane parallel with that of the rotor,
   (g) link means pivoted from the forward end of each control horn and to the peripheral edge of the swashplate,
   (h) laterally extending arms fixed to the peripheral edge of the swashplate,
   (i) positively pitched aerodynamic masses on the outer ends of each arms.
4. In a helicopter:
   (a) a vertical drive shaft,
   (b) a rotor hub at the upper end of the vertical drive shaft,
   (c) a plurality of laterally extending rigid rotor blades pivoted about their feathering axes to the hub,
   (d) forwardly extending control horns on each rotor blade,
   (e) a swashplate mounted for universal pivoting and rotation with the rotor about the vertical drive shaft,
   (f) means to tilt the swashplate out of a plane parallel with that of the rotor,
   (g) link means pivoted from the forward end of each control horn and to the peripheral edge of the swashplate,
   (h) laterally extending arms fixed to the peripheral edge of the swashplate,
   (i) positively pitched aerodynamic masses on the outer ends of each arm,
   (j) a pilot control means,
   (k) resilient control linkage between the pilot control means and the swashplate.
5. In a helicopter:
   (a) a vertical drive shaft,
   (b) a rotor hub at the upper end of the drive shaft,
   (c) a plurality of laterally extending rigid rotor blades pivoted about their feathering axes to the hub,
   (d) forwardly extending control horns on each rotor blade,
   (e) a swashplate mounted on the drive shaft for universal pivoting and rotation with the rotor,
   (f) laterally extending arms fixed to the peripheral edge of the swashplate,
   (g) masses on the outer end of each arm,
   (h) link means pivotably connected to the forward end of each control horn and to the peripheral edge of the swashplate, said link means and horns being arranged to supply a control input to the blade which is angularly offset about 60° ahead of the blade feathering axis,
   (i) a pilot control means,
   (j) linkage means between the pilot control means and the swashplate,
   (k) a resilient connection in the linkage means.
6. In a helicopter:
   (a) a vertical drive shaft,
   (b) a rotor hub at the upper end of the drive shaft,
   (c) a plurality of laterally extending rigid rotor blades pivoted about their feathering axes to the hub, said blades being swept forwardly of their feathering axes,
(d) forwardly extending control horns on each rotor blade,
(e) a swashplate mounted for universal pivoting and rotation with the rotor about the vertical drive shaft,
(f) means to tilt the swashplate out of a plane parallel with that of the rotor,
(g) link means pivoted from the forward end of each control horn and to the peripheral edge of the swashplate,
(h) laterally extending arms fixed to the peripheral edge of the swashplate,
(i) positively pitched aerodynamic masses on the outer ends of each arms.

7. In a helicopter:
(a) a rigid rotor having a plurality of blades each with freedom of movement about its feathering axis only and each being swept forwardly of its feathering axes,
(b) a rotor control gyro adapted to rotate in a plane parallel to the rotor plane of rotation,
(c) a pilot control means,
(d) a control linkage means between the pilot control means and the control gyro,
(e) a resilient connection in the control linkage means,
(f) linkage means between the control gyro and each of the blades of the rotor for changing the angle of attack of each blade, when the gyro and rotor planes of rotation are displaced out of parallel relationship.

References Cited in the file of this patent
UNITED STATES PATENTS

| | | |
|---|---|---|
| 2,489,343 | Wasserman | Nov. 29, 1949 |
| 2,519,762 | Hoffman et al. | Aug. 22, 1950 |
| 2,599,690 | Buivid et al. | June 10, 1952 |
| 2,827,968 | Sissingh et al. | Mar. 25, 1958 |
| 2,856,788 | Jovanovich | Oct. 21, 1958 |
| 2,940,526 | Vongerichten | June 14, 1960 |